Dec. 25, 1928.                                                        1,696,685
                              F. LEUTZ
                        AUTOMOBILE SEAT HINGE
                        Filed April 9, 1927                 3 Sheets-Sheet 1
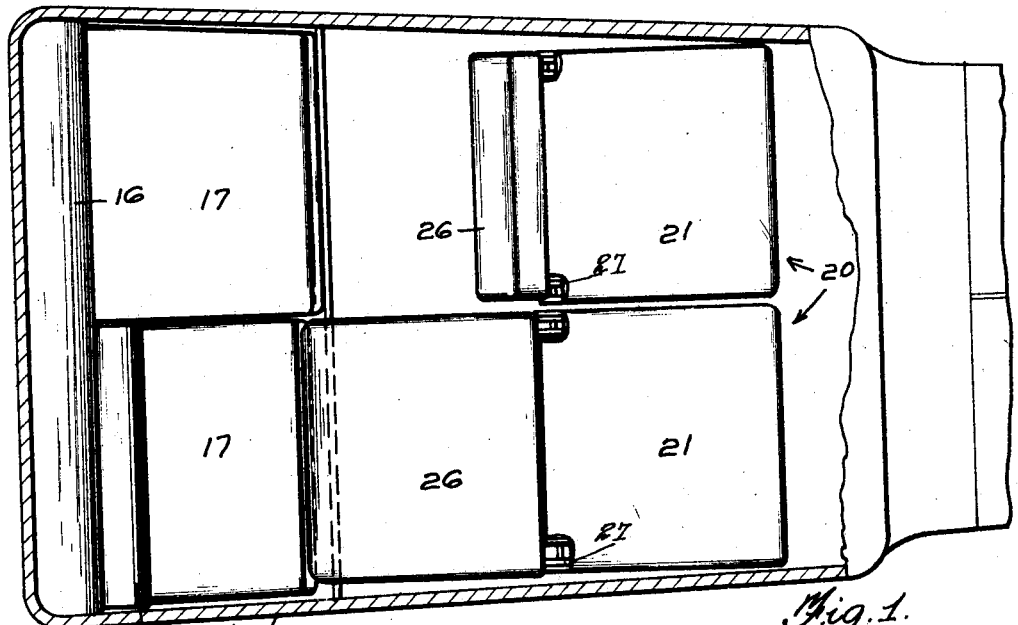
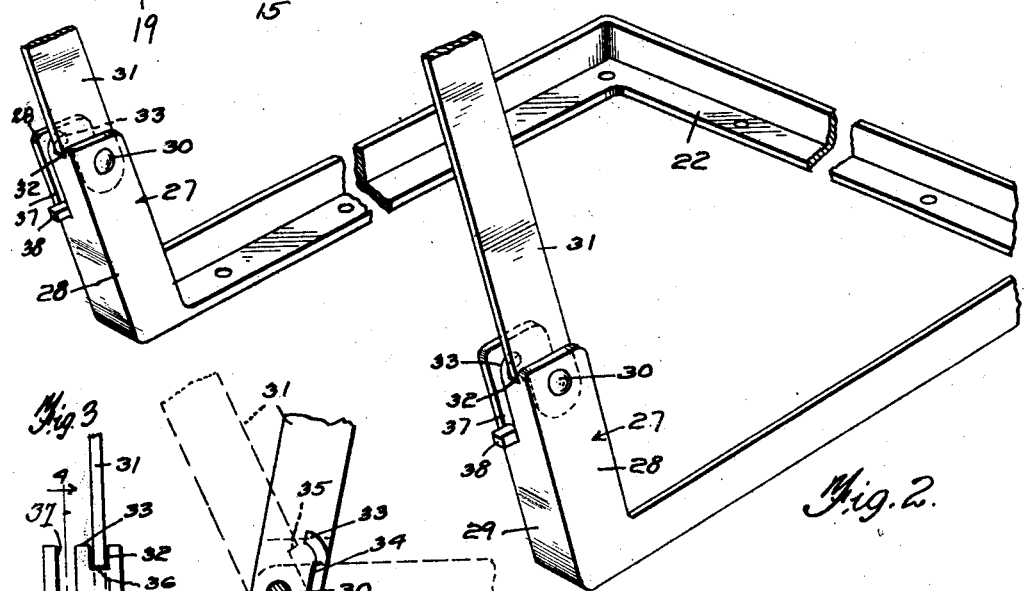
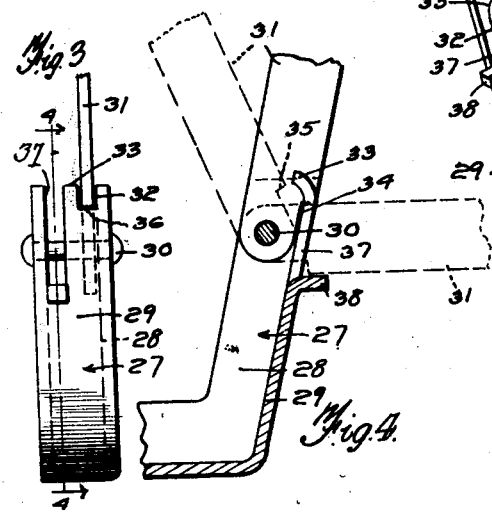
Inventor
Ferdinand Leutz,
By Jerry A. Mathews
Attorney

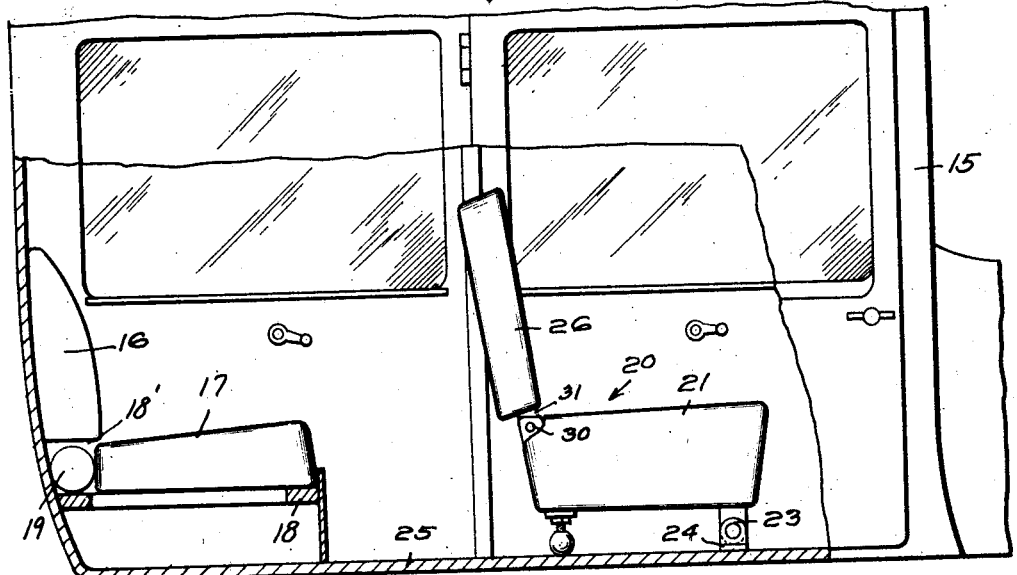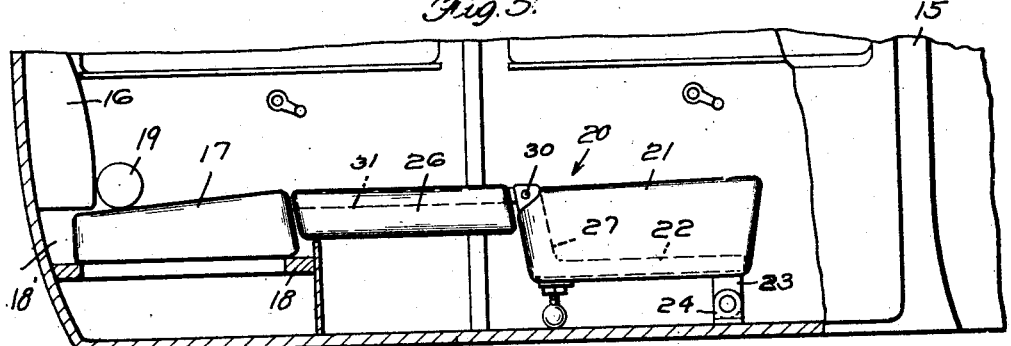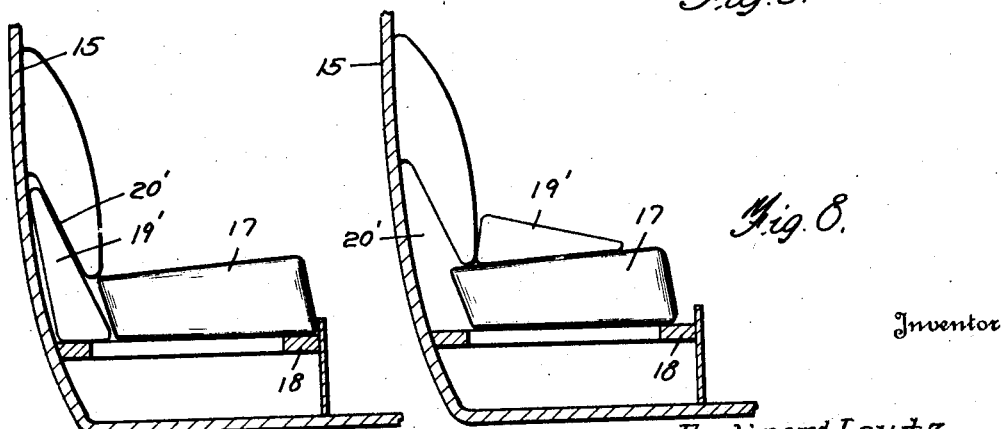

Dec. 25, 1928.　　　　　　　　　　　　　　　　1,696,685
F. LEUTZ
AUTOMOBILE SEAT HINGE
Filed April 9, 1927　　　　3 Sheets-Sheet 3

Inventor.
Ferdinand Leutz,
By
Attorney

Patented Dec. 25, 1928.

1,696,685

UNITED STATES PATENT OFFICE.

FERDINAND LEUTZ, OF HEBRON, NORTH DAKOTA.

AUTOMOBILE SEAT HINGE.

Application filed April 9, 1927. Serial No. 182,403.

My invention relates to an automobile combined seat and bed.

In accordance with my invention, one or both front seats of an automobile are adapted to have their backs swung rearwardly to a horizontal position, for use in conjunction with the rear seat, whereby a bed is produced. In smaller cars, I also contemplate providing a foldable extension at the front of the bottom of the front seat, which may be shifted upwardly and held in horizontal position, to constitute a continuation of the bed bottom.

Figure 9:
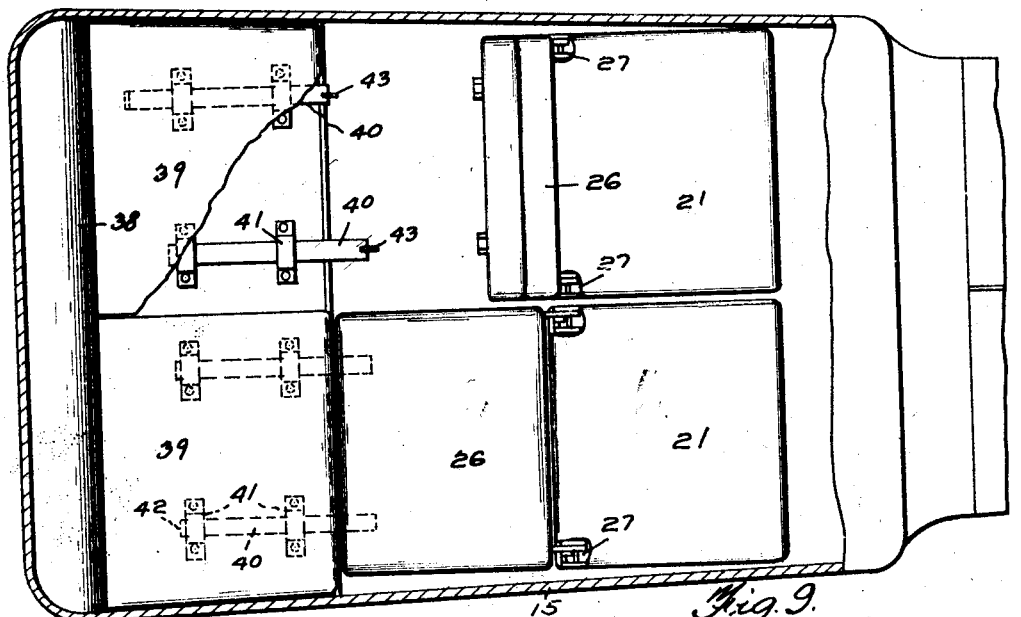
Figure 10:
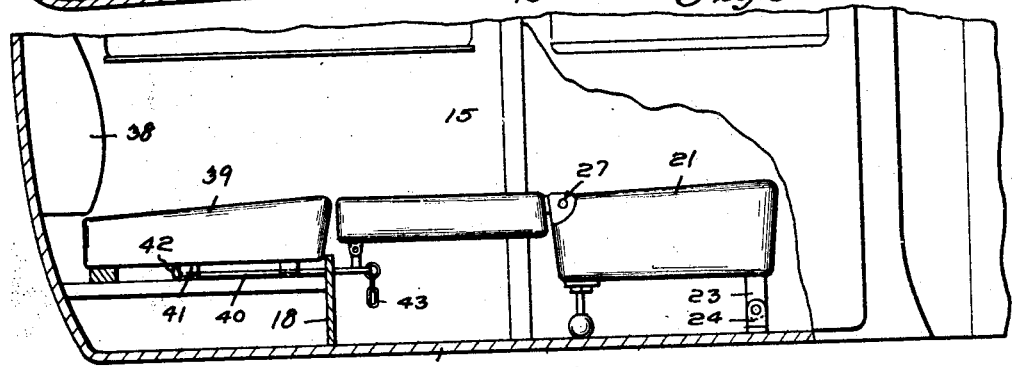
Figure 11:
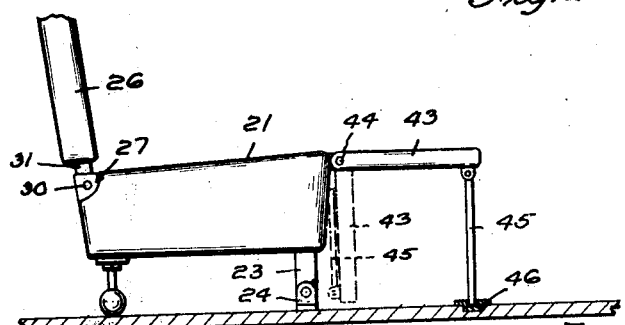

In the accompanying drawings, forming a part of this specification, and in which like numerals are employed to designate like parts throughout the same, Figure 1 is a plan view of a combined seat and bed structure embodying my invention, Figure 2 is a perspective view of the hinge structure of the front seat, Figure 3 is an end elevation of one of the hinges, Figure 4 is a longitudinal section taken on line 4—4 of Figure 3, Figure 5 is a side elevation of the combined seat and bed structure, with the back of the front seat elevated, Figure 6 is a similar view, with the back of the front seat lowered, and associated elements adjusted accordingly, Figure 7 is a side elevation, parts in section, of the rear seat, of a modified form of the invention, showing the bolster in the rear position, Figure 8 is a similar view showing the bolster in the forward position, Figure 9 is a plan view of a further modified form of the invention, the back of the front seat being elevated and the bottom of the rear seat removed, Figure 10 is a side elevation of the same, showing the back of the front seat lowered, with associated elements in place, Figure 11 is a view showing a bed extension element.

In the drawings, wherein for the purpose of illustration, are shown preferred embodiments of my invention, attention being called to Figures 1 to 6, inclusive, the numeral 15 designates the body of a closed automobile, although the invention may be applied to an open automobile. The numeral 16 designates the back or back cushion of the back seat, and 17 designates separate bottom cushions, two being preferably employed. The bottom cushions 17 rest upon the usual seat support 18, as shown. As more clearly shown in Figures 5 and 6, the back cushion 16 is shortened at its bottom, and terminates at the top of the bottom cushion 17, providing a space or chamber 18', for receiving and storing bolsters 19, preferably circular in cross section.

The numeral 20 designates the front seats, embodying bottom cushions 21. These bottom cushions are mounted upon rectangular frames 22, Figure 2. Either or both of the front seats may be foldable forward, and when this is desired, the frame 22 of each bottom cushion is rigidly attached to lugs 23, which are hinged to brackets 24, rigidly attached to the bottom 25 of the automobile body.

Each front seat embodies a back element or cushion 26, and either or both of these back cushions may be adapted to be swung forwardly over the bottom cushion, or locked in the upright position, or adjusted and swung rearwardly to a horizontal position. To accomplish this, each bottom cushion frame 22 and back cushion are provided with hinges, of a novel construction. These hinges embody lower hinge elements 27 which are rigidly attached to the ends of the frame 22 and are U-shaped in horizontal cross section. Each lower hinge element embodies side walls 28, and a back wall 29. A bolt 30 passes transversely through the lower hinge element 27 and is rigidly attached to the side walls 28, and spaced from the back wall 29. The back element or cushion 26 embodies a frame including side bars 31, the lower ends of which serve as upper hinge elements. These lower ends are apertured to slidably receive the bolts 30. The lower ends of the bars 31 are, therefore, projected into the hollow lower hinge elements 27, and are capable of swinging on these bolts or sliding longitudinally thereof. The back wall 29 of each hinge element is provided adjacent the outer side wall 28 with a notch 32, and this back wall carries an inwardly bent stop element or tongue 33, spaced by the notch 32 from the outer side wall 28, a sufficient distance, to permit the side bar 31 to pass between the stop element or tongue 33 and the side wall 28, and the lower end of the bar 31 is reduced at 34, forming a shoulder 35, adapted to engage on the horizontal shoulder 36, formed by the notch 32. It is thus seen that when the bar 31 is shifted to the right in contact with the outer side wall 28, and is swung rearwardly, shoulder 35 will engage shoulder 36, and the rear edge of the bar will be held between the stop element or tongue 33 and the side wall 28, and hence this bar will be locked against rearward swinging movement and also lateral shifting movement. The back wall 29 is also provided with a longitudinal slot 37, extending downwardly below the bolt 30, as clearly shown in Figure 3. At the bottom of the slot 37, a shoulder 38 is preferably stamped outwardly from the back wall 29. By swinging the bar 31 forwardly so that it clears the stop element or tongue 33, this bar may be shifted laterally toward the slot 37, and when in alinement with this slot, the bar may be swung downwardly into the slot 37, to assume a horizontal position. It is to be understood, of course, that the two bars 31 connected with the back element or cushion 26 are rigidly connected, and move as a unit, and the adjustment of both bars is simultaneous.

As shown in Figures 5 and 6, when it is desired to produce a bed structure, the back seat element 17 is removed from the support 18, and the bolster 19 removed from the space or chamber 18'. The back seat element 17 is now shifted rearwardly as shown in Figure 6, whereby its rear end enters the space or recess 18'. The back seat element 26 of the front seat may now be adjusted laterally and swung down to the horizontal position, to rest upon the support 18.

In Figures 7 and 8, a slight modification has been made in the back seat construction. The bolster 19' is generally triangular in cross section, rather than round, and the adjacent ends of the seat element 17 and back element 16 have been correspondingly tapered, whereby the space or recess 20' is of a suitable shape and size to receive the bolster. When the bolster is removed the seat element 17 is moved rearwardly to enter the recess 20' and the bolster 19' may be arranged upon the seat element 17. The back element 26 of the front seat is folded down upon the support 18.

In Figures 9 and 10, I have shown a further modified form of the invention. In these figures, the back seat embodies a back element 38, and a seat element 39, which seat element rests upon the support 18.

Mounted to slide transversely of the support 18, and longitudinally of the body 15 of the automobile are support bars 40, guided in brackets 41, and provided at their rear ends with stop heads 42. The forward ends of the bars 40 have flexible pulling elements 43, such as chains or straps secured thereto, which may be employed to slide the support bars forwardly beyond the support 18. The front and rear seat are positioned a suitable distance apart whereby, when the back element 26 is shifted to the lower horizontal position, such back element will be supported by the bars 40. It is, of course, understood that the same form of hinged construction is employed.

I also contemplate providing a bed extension element 43, at the forward end of the seat element 21 of the bottom seat and the extension is pivoted to this seat element, at 44, to swing vertically. The extension element 43 is provided with a pivoted foot 45, the lower end of which is adapted, to engage within a socket 46, attached to the floor of the automobile body. When the extension element 43 is not being used, the foot 45 may be swung upwardly to lie close to the extension element 43 and this extension element dropped to a vertical position. The extension element is particularly useful where a combined seat and bed structure is installed in a short or small automobile where the front and back seats are not sufficiently far apart to provide a bed of sufficient length.

It is thus seen that I have provided a construction, wherein the back element of the front seat may be folded down to co-operate with the seat element of the front seat and the seat element of the back seat, in providing a bed construction.

It is to be understood that the forms of my invention, herewith shown and described, are to be taken as preferred examples of the same, and that various changes in the shape, size and arrangement of parts may be resorted to without departing from the spirit of my invention, or the scope of the subjoined claims.

Having thus described my invention, I claim:—

1. A hinge for the back section of an automobile seat, comprising a lower hinge section including sides and a back, said back having an inwardly projecting stop tongue spaced from both sides and a longitudinal slot upon one side of the stop tongue, a pin carried by the sides, and an upper hinge section having an aperture to receive the pin, said upper hinge section being of a width to pass between the stop tongue and either side, said stop tongue serving to lock the upper hinge section against lateral displacement.

2. A hinge for the back section of an automobile seat, comprising an upstanding lower hinge section including sides and a back, said back having an inwardly projecting stop tongue spaced from both sides, said back being provided upon one side of the stop tongue with a notch and upon the opposite side of the stop tongue with a longitudinal slot extending downwardly below the notch for a substantial distance, a pin connecting said sides, and an upper hinge section having an aperture to pivotally receive the pin, said upper hinge section having a shoulder near its aperture, the upper hinge section being of a width to pass between the stop tongue and either side section, said stop tongue serving to lock the upper hinge section against lateral displacement, the shoulder of the upper hinge section being adapted to engage within said notch.

3. A hinge for the back section of an automobile seat, comprising a lower hinge section including sides and a back, said back having an upstanding stop tongue spaced from both sides, said back having a notch upon one side of the stop tongue and a longitudinal slot upon the opposite side of the stop tongue, said slot being longer than the notch, a pin carried by said sides, and an upper hinge section having its free end reduced to provide a shoulder, said free end being apertured to receive the pin, said upper hinge section being of a width to pass between the stop tongue and either side, said stop tongue serving to lock the upper hinge section against lateral displacement.

In testimony whereof I affix my signature.

FERDINAND LEUTZ.